(12) United States Patent
Bosetti et al.

(10) Patent No.: US 7,833,502 B2
(45) Date of Patent: Nov. 16, 2010

(54) INTEGRATED PROCESS FOR THE PRODUCTION OF HYDROGEN FROM HYDROGEN SULPHIDE

(75) Inventors: Aldo Bosetti, Vercelli (IT); Alberto de Angelis, Legnano (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 12/402,981

(22) Filed: Mar. 12, 2009

(65) Prior Publication Data

US 2009/0238750 A1 Sep. 24, 2009

Related U.S. Application Data

(60) Provisional application No. 61/037,532, filed on Mar. 18, 2008.

(51) Int. Cl.
*C01B 3/04* (2006.01)
*C01B 17/04* (2006.01)

(52) U.S. Cl. .................. 423/220; 423/573.1; 423/648.1; 423/658.2; 423/DIG. 10; 208/209; 208/214

(58) Field of Classification Search ................. 423/220, 423/573.1, 648.1, 658.2, DIG. 10; 208/209, 208/214

See application file for complete search history.

(56) References Cited

U.S. PATENT DOCUMENTS

| 3,933,608 A * | 1/1976 | Haas et al. ................... 204/164 |
| 5,211,923 A | 5/1993 | Harkness et al. |
| 2005/0191237 A1 | 9/2005 | Selinger et al. |

* cited by examiner

*Primary Examiner*—Timothy C Vanoy
(74) *Attorney, Agent, or Firm*—Oblon, Spivak, McClelland, Maier & Neustadt, L.L.P.

(57) ABSTRACT

A process to efficiently remove sulfur compounds from a hydrocarbon stream in a refinery operation includes the production and recycle of hydrogen from the sulfur compounds. The sulfur compounds present in the hydrocarbon cut are converted to hydrogen sulphide which is split to hydrogen and sulfur in a non-thermal plasma reactor.

12 Claims, 1 Drawing Sheet

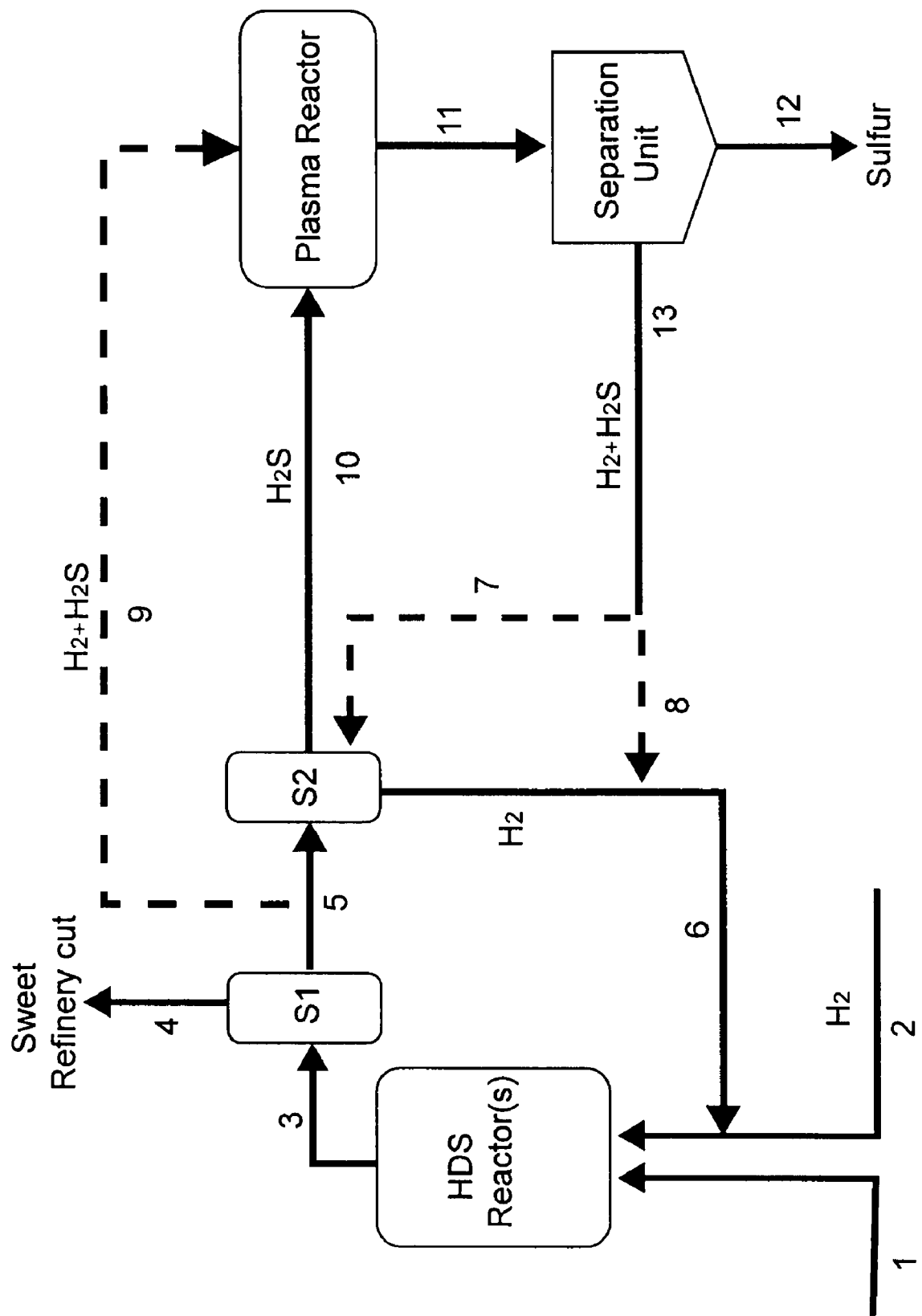

INTEGRATED PROCESS FOR THE PRODUCTION OF HYDROGEN FROM HYDROGEN SULPHIDE

CROSS REFERENCE TO RELATED APPLICATIONS

This application claims priority to U.S. Provisional Patent Application 61/037,532, filed Mar. 18, 2008, the disclosure of which is incorporated herein by reference in its entirety.

BACKGROUND OF THE INVENTION

Field of the Invention

The present invention describes an integrated process for the production and use of hydrogen which can be used inside a refinery configuration.

Conventionally, the hydrogen sulphide coming from the purification processes of refinery streams or from the treatment of natural gas is a by-product which is transformed into elemental sulphur and water.

Its transformation into hydrogen and sulphur, by means of a thermal splitting process, allows a further utility of the hydrogen sulphide and improves the efficiency of the refining process.

Plasma technologies for converting hydrogen sulphide to hydrogen are known, and are claimed in various patents.

In particular the use of a plasma process is also known from two patents (U.S. Pat. No. 5,211,923 and US-2005/191237, within the processing schemes of a refinery.

U.S. Pat. No. 5,211,923 claims a production configuration of hydrogen and sulphur with a microwave plasma reactor, starting from an acidic gas coming from refinery purification treatment in which the total $H_2S$ conversion can also be obtained by the use of a catalytic reactor using an aliquot of the hydrogen thus produced.

US-2005/191237 claims a hydrogen production configuration starting from generic gaseous feeds containing $H_2S$ by means of a plasma treatment generated by electromagnetic energy (microwaves).

The gaseous feed is treated to selectively remove the hydrogen sulphide, the $H_2S$ is then sent to a plasma reactor in which the decomposition reaction takes place to give hydrogen and sulphur. Hydrogen is separated from sulphur in a purification system downstream of the reactor in addition to the non-reacted $H_2S$, which is sent for recycling in the purification system of the gaseous feed.

Such conventional thermal plasma reactors suffer in terms of energy and cost efficiency because of the energy consumption required to obtain the thermally equilibrated high temperatures necessary in the reactor and in addition, due to the high thermal energy, contaminate yield lowering by-products are obtained. Moreover, due to the high reaction temperatures, equipment and reactor requirements are elevated. As a result, incorporating such equipment into the refinery plant can be problematic.

There is therefore a need in the refinery industry for a process to prepare hydrogen from hydrogen sulphide which is energy and cost efficient and can be accomplished in a manner which easily integrates into the refinery environment.

BRIEF DESCRIPTION OF THE OF THE DRAWING

The FIGURE is a schematic diagram of a preferred embodiment of the invention.

DETAILED DESCRIPTION OF THE INVENTION

In an embodiment according to the present invention, a process using a cold plasma system for transforming hydrogen sulphide to hydrogen and sulphur, which provides improved integration with the other units of the refinery, and at the same time improves energy efficiency is provided. Among emerging technologies in this field, cold plasma technologies have attracted the most attention due to the high yields of hydrogen that can be achieved with such technology. More specifically, the processes are based on the transformation of $H_2S$ in a reactor in which plasma is created by means of electric discharges in contrast to technologies in which a thermodynamic equilibrium is involved.

Under the particular conditions in which it is created (pressure, energy applied and electronic density), a "cold" plasma contains gas molecules at a temperature in a range from room temperature to about 1000° K, preferably on the order of a few hundreds of degrees, such as, for example, in the range from 300 to 1000° K, and most preferably 500 to 1000° K, together with electrons with extremely high kinetic energy corresponding to temperatures in the order of 15,000° K. In this way, it is possible to selectively supply energy for the desired reaction while avoiding the decomposition reactions typical of conventional "hot" or thermal plasmas and technologies involving a thermodynamic equilibrium in which all the gas components are at the same temperature and the equilibrium temperature is much higher than 1000° K. Studies have shown that when cold plasma technology is employed, the outgoing gaseous flow, after separation of the liquid sulphur, consists of prevalently hydrogen and non-reacted hydrogen sulphide.

A particularly effective type of cold plasma reactor is a Gliding Arc Tornado (GAT) reactor. A conversion in a single passage of up to approximately 95% of hydrogen sulphide has been experimentally demonstrated in a GAT reactor on a laboratory scale. 1 $Nm^3$ of hydrogen was produced with an energy cost of about 0.8 kWh.

The GAT system is based on the creation, through suitably configured electrodes, of a spiral of plasma continuously in movement like a tornado inside a cylindrical reactor. It is as if the discharge and consequent plasma area are formed and slide along the walls of the electrodes until reaching a limit area in which there is the end of the plasma itself. The hydrogen sulphide gas is charged tangentially into the reactor so as to flow like an inverse vortex with respect to the rotating plasma. An effective energy exchange between the two flows is thus obtained with a consequent increase in the yields of the hydrogen and sulfur.

In a preferred embodiment of the present invention, the process integrated in a refinery for the production of hydrogen from hydrogen sulphide obtained from a hydrocarbon cut containing sulphur comprises the following steps:

hydrodesulphurizing the hydrocarbon cut by reaction with hydrogen in the presence of a catalyst to transform the sulphur contained therein into hydrogen sulphide;

separating the stream subjected to the hydrodesulphuration to obtain a first stream containing the hydrocarbon cut substantially free of sulphur-based components and a second stream mainly containing the hydrogen sulphide formed and the non-reacted hydrogen, optionally, separating the second stream to obtain a stream comprising hydrogen sulphide and a stream comprising the non-reacted hydrogen;

if the optional separation of the second stream is performed, recycling the separated non-reacted hydrogen to the hydrodesulphuration;

reacting the separated second stream containing the hydrogen sulphide formed and the non-reacted hydrogen or, if the optional second separation is performed, the stream consisting of the hydrogen sulphide, in a non-thermal plasma reactor to produce a product stream containing hydrogen, non-reacted hydrogen sulphide and sulphur;

recovering the sulphur by removal from the product stream of the non-thermal reactor;

recycling the product stream, from which the sulphur has been removed, to the hydrodesulphuration and/or to the optional purification.

The typical refinery hydrocarbon cut may, for example, be a mixture of hydrocarbons such as gasoline, cracking-naphtha, medium distillates and/or heavy distillates of the diesel type.

If the stream subjected to the hydrodesulphuration is separated by liquid/gas separation only, it may be preferrable for the product stream leaving the plasma reactor, from which the sulphur has been removed, to be further subjected to a separation creating a stream comprising hydrogen, which may be recycled to the hydrodesulphuration, and a stream comprising hydrogen sulphide, which may be recycled to the non-thermal plasma reactor. This further separation of the second stream mainly containing the hydrogen sulphide formed and the non-reacted hydrogen, may preferably comprise washing with amines or membrane separation.

The non-thermal plasma reactor may preferably operate at pressures ranging from 0.5 to 100 bar, more preferably 0.5 to 20 bar, and most preferably 1 to 15 bar, at temperatures of the gaseous components ranging from room temperature to 1,000 K, preferably from 300 to 1000° K, and most preferably 500 to 1000° K, and in the presence of other species, such as electrons and/or ions, having a kinetic energy corresponding to much higher temperatures than those of the gas, preferably higher than 10,000° K, more preferably higher than 15,000° K and lower than or equal to 50,000° K.

The preferred plasma reactor is a GAT (Gliding Arc Tornado) reactor.

The hydrodesulphuration may be carried out at a temperature equal to or greater than 100° C., preferably greater than 100° C. and less than 500° C., and at a pressure higher than or equal to 30 bar, preferably 30 to 100 bar.

The catalysts which may be used in the hydrodesulphurization are conventionally known and include, for example, catalysts based on nickel, cobalt and molybdenum.

The optional further separation of the second stream mainly containing the hydrogen sulphide formed and the non-reacted hydrogen is preferably effected by washing with amines or by membrane separations.

The sulphur recovery may be accomplished by a gas/solid separation and optionally includes cooling of the non-thermal plasma reactor product stream upstream of the sulphur separation and/or optionally includes further sulphur treatment downstream of the sulphur separation.

The product stream from the plasma reactor, from which the sulphur has been removed, may be sent to the hydrodesulphuration and/or to the further separation of the purification step, depending on the degree of purity of the hydrogen of the stream itself.

An embodiment of the present invention is now provided, with the help of the enclosed FIGURE which should not be considered as limiting the protection scope of the invention itself.

A typical refinery cut of hydrocarbons (1) (Refinery cut) is reacted with hydrogen (2) in the presence of a catalyst, in one or more hydrodesulphuration (HDS) reactors in order to purify it from sulphur which is thus transformed into hydrogen sulphide.

The stream (3) leaving the reactors (HDS) is sent to a purification step comprising a liquid/gas separator (S1) in which the hydrocarbon stream free of sulphur-based components (4) (Sweet refinery cut) is separated from the stream essentially consisting of the hydrogen which was not used up in the hydrodesulphuration reaction.

Said stream (5) can be sent to a further separation (S2) by means, for example, of a washing with amines, in order to separate the non-consumed hydrogen, which is recycled (6) to the hydrodesulphuration step, from the hydrogen sulphide stream (10) before being sent to the plasma reactor.

Alternatively, the plasma reaction can be effected directly on the effluent (9) consisting of hydrogen and hydrogen sulphide coming from the separator (S1), thus avoiding the purification pre-treatment of the feedstock.

The effluent (11) from the Plasma Reactor section, mainly consisting of hydrogen and possibly non-reacted hydrogen sulphide, is sent to a separation unit in which cooling takes place, together with separation and treatment of the sulphur (12) from the components leaving the reactor.

The outgoing stream (13) from which the sulphur has been separated, depending on its degree of purity, can be recycled (8) to the hydrodesulphuration step and/or (7) to further separation by means of amine washing.

Numerous modifications and variations of the present invention are possible in light of the above teachings. It is therefore to be understood that within the scope of the appended claims, the invention may be practiced otherwise than as specifically described herein.

The invention claimed is:

1. A process for the production of hydrogen from hydrogen sulphide, comprising:

hydrodesulphurizing a hydrocarbon cut of a refinery process by reaction with hydrogen in the presence of a catalyst to transform sulphur compounds contained therein into hydrogen sulphide;

separating the stream subjected to the hydrodesulphuration to obtain a first stream consisting of the hydrocarbon cut substantially free of sulphur-based components and a second stream mainly containing the hydrogen sulphide formed and the non-reacted hydrogen, separating the second stream to obtain a stream consisting essentially of hydrogen sulphide and a stream comprising the non-reacted hydrogen;

recycling the separated non-reacted hydrogen to the hydrodesulphuration;

reacting the stream consisting essentially of the hydrogen sulphide, in a non-thermal plasma reactor to produce a product stream containing hydrogen, non-reacted hydrogen sulphide and sulphur;

recovering the sulphur by removal of the sulfur from the product stream of the non-thermal reactor;

recycling the product stream, from which the sulphur has been removed, to the hydrodesulphuration and/or to the separation of the second stream;

wherein the process is integrated in a hydrocarbon refining process, and the hydrocarbon cut comprises sulphur compounds.

2. The process according to claim 1, wherein a pressure of the reacting in the non-thermal plasma reactor is in the range from 0.5 to 100 bar, a temperature of gaseous components in the non-thermal plasma reactor is in the range from room temperature to 1,000° K and a kinetic energy of other species in the non-thermal plasma reactor is in a range corresponding to temperatures from 10,000° K to 50,000° K, wherein the other species are selected from the groups consisting of electrons, ions and mixtures thereof.

3. The process according to claim 2, wherein the kinetic energy of the other species is greater than 15,000 K.

4. The process according to claim 1, wherein the non-thermal plasma reactor comprises:

a cylindrical reactor electrodes comprising walls, and a plasma, wherein the electrodes are configured to form a spiral cyclical movement of the plasma along the walls of the electrodes.

5. The process according to claim 4, wherein in the reacting the separated second stream containing the hydrogen sulphide formed the hydrogen sulphide comprising stream is tangentially charged to the spiral cyclical movement of the plasma.

6. The process according to claim 4, wherein the non-thermal plasma reactor is a Gliding Arc Tornado reactor.

7. The process according to claim 1, wherein a temperature of the hydrodesulphuration is in a range of from 100° C. to 500° C., and a pressure is in a range from 30 bar to 100 bar.

8. The process according to claim 1, wherein the separation of the second stream comprises washing with amines or a membrane separation.

9. The process according to claim 1, wherein the sulphur recovery comprises a gas liquid separation.

10. The process according to claim 9, wherein the sulphur recovery further comprises a cooling of the product stream upstream of the separation and/or a sulphur treatment downstream of the separation.

11. The process according to claim 1, wherein the hydrocarbon cut of a refinery process is a hydrocarbon selected from the group consisting of gasoline, cracking-naphtha, a diesel oil medium distillate and a diesel oil heavy distillate.

12. The process according to claim 1, wherein the hydrodesulphurization catalyst comprises at least one compound of at least one metal selected from the group consisting of nickel, cobalt and molybdenum.

* * * * *